(12) United States Patent
Pu et al.

(10) Patent No.: US 8,046,401 B2
(45) Date of Patent: Oct. 25, 2011

(54) CANONICAL SIGNED DIGIT MULTIPLIER

(75) Inventors: Tianyan Pu, Singapore (SG); Lei Bi, Singapore (SG)

(73) Assignee: NXP B.V., Eindhoven (NL)

( * ) Notice: Subject to any disclaimer, the term of this patent is extended or adjusted under 35 U.S.C. 154(b) by 671 days.

(21) Appl. No.: 11/910,454

(22) PCT Filed: Mar. 23, 2006

(86) PCT No.: PCT/IB2006/050892
§ 371 (c)(1),
(2), (4) Date: Oct. 23, 2008

(87) PCT Pub. No.: WO2006/103601
PCT Pub. Date: Oct. 5, 2006

(65) Prior Publication Data
US 2009/0070394 A1    Mar. 12, 2009

(30) Foreign Application Priority Data

Mar. 31, 2005  (EP) ..................................... 05102546

(51) Int. Cl.
*G06F 7/487*    (2006.01)
(52) U.S. Cl. ...................................................... 708/620
(58) Field of Classification Search ........................ None
See application file for complete search history.

(56) References Cited

U.S. PATENT DOCUMENTS 4,967,388 A * 10/1990 Tate .............................. 708/628
5,262,974 A * 11/1993 Hausman et al. ............. 708/493

(Continued)

FOREIGN PATENT DOCUMENTS

CN       1288545 A    3/2001
(Continued)

OTHER PUBLICATIONS

Kosunen, M., et al. "A Programmable FIR Filter Using Serial-In-Time Multiplication and Canonic Signed Digit Coefficients", $7^{th}$ IEEE Int'l. Conf. on Electronics, Circuits & Systems, pp. 563-566 (2000).

(Continued)

*Primary Examiner* — David H Malzahn (57) ABSTRACT

A multiplier is able to multiply an input data value by a selected constant value in CSD form. The selected constant value has a plurality of pairs of bits, and the multiplier includes multiplexers, each controlled by a respective pair of bits of the selected constant value. Each of the multiplexers has a plurality of inputs, and is connected to receive the input data value, the inverse of the input data value, and all zeros on said inputs, and it is controlled such that it outputs either the input data value, the inverse of the input data value, or all zeros, depending on the values of the respective pair of bits of the selected constant value. Variable shift blocks are each connected to receive an input from a respective one of said multiplexers, and are each adapted to shift their received input by a first bit shift value or a second bit shift value, depending on the values of the respective pair of bits of the selected constant value, wherein the first bit shift value and the second bit shift value differ by 1. The multiplier also includes combination circuitry, for receiving the outputs from the plurality of shift blocks, and for combining the outputs from the plurality of shift blocks and applying further bit shifts, to form an output value equal to the result of multiplying the input data value by the selected constant value.

9 Claims, 4 Drawing Sheets

U.S. PATENT DOCUMENTS

| | | | | |
|---|---|---|---|---|
| 5,313,414 | A * | 5/1994 | Yang et al. | 708/625 |
| 6,609,143 | B1 | 8/2003 | Kanakogi et al. | |
| 6,687,726 | B1 * | 2/2004 | Schneider | 708/625 |
| 7,080,115 | B2 * | 7/2006 | Parhi et al. | 708/625 |
| 7,164,712 | B2 | 1/2007 | Wittig | |
| 7,257,609 | B1 * | 8/2007 | Kosunen et al. | 708/493 |
| 7,680,872 | B2 * | 3/2010 | Saado | 708/620 |
| 7,711,761 | B2 * | 5/2010 | Lo Iacono et al. | 708/204 |
| 7,912,891 | B2 * | 3/2011 | Cho et al. | 708/625 |
| 2003/0220956 | A1 * | 11/2003 | Parhi et al. | 708/620 |
| 2006/0215615 | A1 | 9/2006 | Maeda | |

FOREIGN PATENT DOCUMENTS

| | | |
|---|---|---|
| DE | 42 23 999 C1 | 7/1993 |
| JP | 10-049347 A | 2/1998 |
| JP | 10-187767 A | 7/1998 |
| JP | 2000-066878 A | 3/2000 |
| JP | 2003-516692 A | 5/2003 |
| JP | 2004-320253 A | 11/2004 |
| WO | 02/33537 A1 | 4/2002 |

OTHER PUBLICATIONS

Yeung, K. "Multiplier-less FIR Digital Filters Using Programmable Sum-of-Power-of-two (SOPOT) Coefficients", 2002 IEEE Int'l. Conf. Proc. Field-Programmable Technology, pp. 78-84 (2002).

Oh, J., et al. "Implementation of Orthogonal Frequency Division Multiplexing Modem Using Radix-N Pipeline Fast Fourier Transform (FFT) Processor,", Jpn. J. Appl. Phys., vol. 2, pp. 2176-2181 (2003).

* cited by examiner

CANONICAL SIGNED DIGIT MULTIPLIER

This invention relates to a multiplier, and in particular to a multiplier for multiplying input data by multiple constants.

In many digital signal processing applications, it is necessary to multiply input data by multiple constants. For example, in the case of a finite impulse response (FIR) filter, or a fast fourier transform (FFT) processor, it is necessary to multiply input data by constant coefficients. FIR filters and FFT processors are used in many digital signal processing applications, for example in wireless communications applications.

Since it is computationally expensive to perform multiplications, it is known to perform the required calculations by representing the coefficients by means of canonical signed digit (CSD) multipliers. This allows the required multiplication to be performed by means of a sequence of shift operations and add operations. A number is said to be in CSD format if it is in the form $b_0 b_1 b_2 \ldots b_{N-1}$, where each $b_i$, for $i=0, 1, 2, \ldots, N-1$, takes one of the values $0, +1, -1$, and where no two consecutive $b_i$ are non-zero.

The document "Implementation of Orthogonal Frequency Division Multiplexing Modem Using Radix-N Pipeline Fast Fourier Transform (FFT) Processor", Oh, et al, Jpn. J. Appl. Phys. Vol. 42 (2003) pp. 1-6 discloses a hardware structure for implementation of a CSD-encoded multiplier. An input signal is applied to a switching network through a set of right shift elements in parallel. The switching network then operates to apply the right-shifted inputs to a set of output multiplexers, based on the required multiplication constants. The output multiplexers are controlled by a select signal to allow the processed data to be output sequentially.

This structure becomes complex when the number of required multiplication constants increases. Specifically, the design of the switching network becomes complex as the number of required multiplication constants increases, while the size of each of the output multiplexers also increases as the number of required multiplication constants increases.

This structure also has the disadvantage that, since the low order bits are discarded before the output values are accumulated, the structure leads to relatively large truncation errors.

According to the present invention, there is provided a multiplier, for multiplying an input data value by a selected constant value in CSD form, wherein the selected constant value is made up of pairs of bits, the multiplier comprising:

a plurality of multiplexers, wherein each of said multiplexers is controlled by a respective pair of bits of the selected constant value, and wherein each of said multiplexers has a plurality of inputs, and is connected to receive the input data value, the inverse of the input data value, and all zeros on said inputs, and being controlled such that it outputs either the input data value, the inverse of the input data value, or all zeros, depending on the values of the respective pair of bits of the selected constant value;

a plurality of variable shift blocks, each connected to receive an input from a respective one of said multiplexers, and each being adapted to shift its received input by a first bit shift value or a second bit shift value, depending on the values of the respective pair of bits of the selected constant value, wherein the first bit shift value and the second bit shift value differ by 1; and combination circuitry, for receiving the outputs from the plurality of shift blocks, and for combining the outputs from the plurality of shift blocks and applying further bit shifts, to form an output value equal to the result of multiplying the input data value by the selected constant value.

This has the advantage that it allows implementation of a CSD-encoded multiplier efficiently in hardware, with an acceptable level of truncation error.

Figure 1:
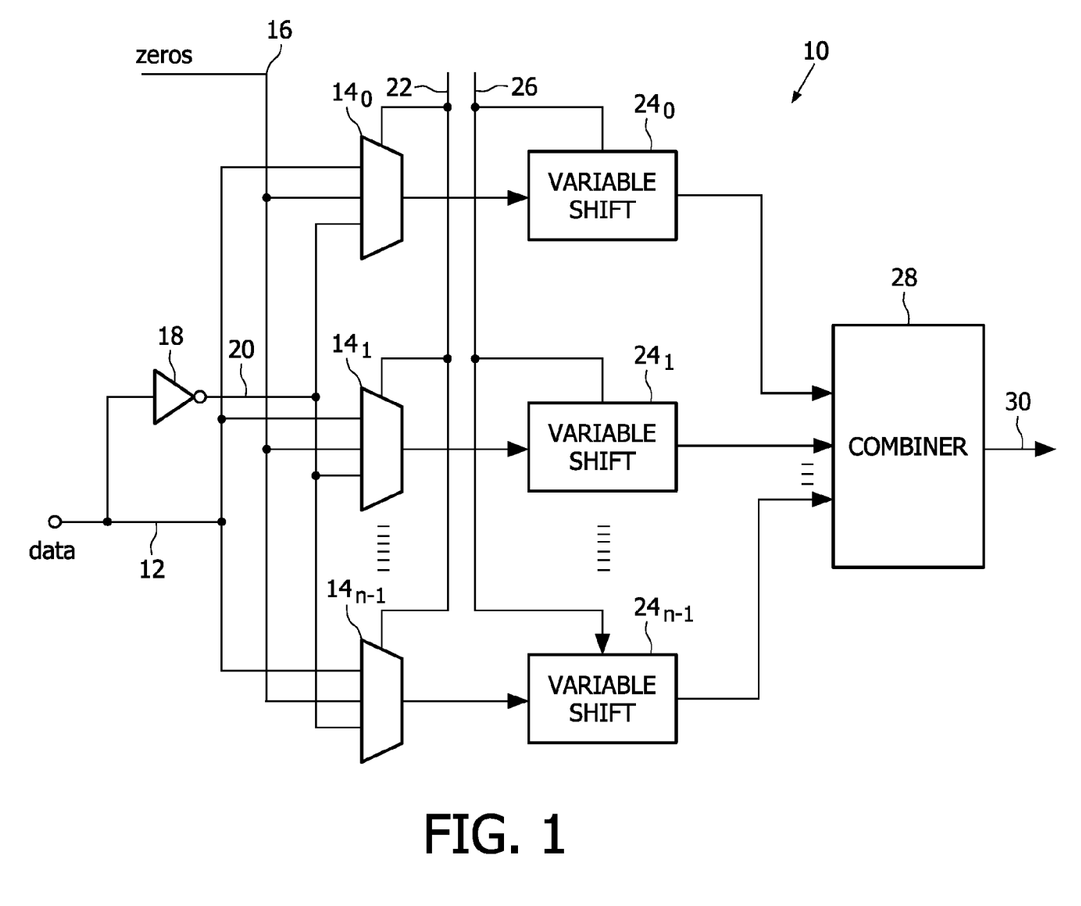
FIG. 1 is a block schematic diagram showing the general form of a multiplier in accordance with the present invention.

FIG. 1 shows the general form of a multiplier 10 in accordance with the present invention. As is well known, the function of a canonical signed digit (CSD) multiplier is to multiply successive input data values by one or more predetermined constant values, where the input data values are in binary format, and the constant values are in CSD format. That is, the input data values are in the form $d_0 d_1 d_2 \ldots d_{M-1}$, where each $d_i$, for $i=0, 1, 2, \ldots, M-1$, takes one of the values $0$ or $+1$, while the constant values are in the form $b_0 b_1 b_2 \ldots b_{N-1}$, where each $b_i$, for $i=0, 1, 2, \ldots, N-1$, takes one of the values $0, +1, -1$, and where no two consecutive $b_i$ are non-zero.

Thus, the CSD multiplier must be able to receive an input data value, and multiply it by a selected one of the predetermined constant values, and then supply the result as an output value.

The result of the multiplication is $d_0 d_1 d_2 \ldots d_{M-1} \times b_0 b_1 b_2 \ldots b_{N-1}$, and, as is conventional, the multiplier 10 calculates this result by means of appropriate additions and shift operations.

In FIG. 1, the input data values are received on a data line 12. Where the input data values are m-bit values, the data line 12 is an m-bit line. The input data values received on the data line 12 are applied to respective first inputs of each of n multiplexers $14_0, 14_1, \ldots, 14_{n-1}$.

A second input line 16 carries m zeros in parallel, and these are applied to respective second inputs of the multiplexers $14_0, 14_1, \ldots, 14_{n-1}$.

The input data values received on the data line 12 are also applied to an inverter 18, to form the twos-complement of the input data values, and the resulting twos-complemented version of the input data values are applied on the inverse line 20 to respective third inputs of the multiplexers $14_0, 14_1, \ldots, 14_{n-1}$.

The multiplexers $14_0, 14_1, \ldots, 14_{n-1}$ are controlled by a control signal on a first control line 22. As mentioned above, there are n multiplexers $14_0, 14_1, \ldots, 14_{n-1}$, and this is the case when the constant values in CSD format each have 2n bits. That is, the constant values are in the form $b_0 b_1 b_2 \ldots b_{2n-2} b_{2n-1}$, where each $b_i$, for $i=0, 1, 2, \ldots, 2n-1$, takes one of the values $0, +1, -1$, and where no two consecutive $b_i$ are non-zero.

Thus, the first multiplexer $14_0$ is controlled by the first two bits $b_0 b_1$, of the constant value which is in use at this moment, the second multiplexer $14_1$, is controlled by the third and fourth bits $b_2b_3$ of the constant value which is in use at this moment, and so on, while the final multiplexer $14_{n-1}$ is controlled by the penultimate and final bits $b_{2n-2}b_{2n-1}$ of the constant value which is in use at this moment.

In the constant value which is in use at this moment, it can be taken that no two consecutive bits are non-zero, because this is a condition of the CSD format. Therefore, taking as an example the first multiplexer $14_0$, this is controlled by the combination of the two bits $b_0b_1$, and this combination has five possible values in the CSD representation, namely: 0 0, 0 1, 1 0, −1 0 and 0 −1.

If $b_0b_1$ equals 0 0, the first multiplexer $14_0$ is controlled such that it passes to its output the value on its second input, namely all zeros. If $b_0b_1$ equals 0 1 or 1 0, the first multiplexer $14_0$ is controlled such that it passes to its output the value on its first input, namely the input data value. If $b_0b_1$ equals 0 −1 or −1 0, the first multiplexer $14_0$ is controlled such that it passes to its output the value on its third input, namely the twos-complemented version of the input data value.

The other multiplexers are controlled by their respective pairs of bits from the constant value which is in use at this moment, in a corresponding way.

The outputs from the multiplexers $14_0, 14_1, \ldots, 14_{n-1}$ are passed to respective variable shift blocks $24_0, 24_1, \ldots, 24_{n-1}$, and the variable shift blocks $24_0, 24_1, \ldots, 24_{n-1}$ are controlled by a control signal on a second control line 26.

Specifically, the first variable shift block $24_0$ is controlled on the basis of the first two bits $b_0b_1$ of the constant value which is in use at this moment, the second variable shift block $24_1$ is controlled on the basis of the third and fourth bits $b_2b_3$ of the constant value which is in use at this moment, and so on, while the final variable shift block $24_{n-1}$ is controlled on the basis of the penultimate and final bits.

The variable shift blocks $24_0, 24_1, \ldots, 24_{n-1}$, can be right shifters, or left shifters, or a combination of right shifters and left shifters. In any event, the input to each of the variable shift blocks $24_0, 24_1, \ldots, 24_{n-1}$, is the output from the respective one of the multiplexers $14_0, 14_1, \ldots, 14_{n-1}$. In each case, it is desired that the output of the variable shift block should be proportional to the result of multiplying the input data value by the appropriate pair of bits of the constant value.

The sign of this output is determined by the control of the multiplexer, while the magnitude of the output is determined by the control of the shift that is applied by the variable shift block 24. Each of the variable shift blocks $24_0, 24_1, \ldots, 24_{n-1}$, is controlled such that it applies a respective shift value of $S_0, S_1, \ldots, S_{n-1}$, and each of these shift values can take either a first or a second value, which differ by one, depending on whether the non-zero bit in the appropriate pair of bits of the constant value is the more significant bit or the less significant bit.

Thus, considering the variable shift block $24_0$, this shifts the input data based on the value of the bit pair $b_0b_1$. If the more significant bit $b_0$ is nonzero, it does not perform any right shift, but simply passes through its input. If the less significant bit $b_1$ is nonzero, it performs a right shift by 1 bit position. If $b_0$ and $b_1$ are both zero, it is irrelevant whether the shifter performs a right shift by 1 bit position or just passes through its input because, as described above, that input will consist entirely of zeros.

It should be noted that although, as described here, the variable shift block $24_0$ does not perform any right shift if the more significant bit $b_0$ is nonzero, and performs a right shift by 1 bit position if the less significant bit $b_1$ is nonzero, it is the relative sizes of these two possible shift values that is important, rather than their absolute values. Thus, for example, the variable shift block $24_0$ could perform a right shift by 2 bit positions if the more significant bit $b_0$ is nonzero, and could then perform a right shift by 3 bit positions if the less significant bit $b_1$ is nonzero. Alternatively, the variable shift block $24_0$ could perform a left shift by 3 bit positions if the more significant bit $b_0$ is nonzero, and could then perform a left shift by 2 bit positions if the less significant bit $b_1$ is nonzero. In each case, the bit shift if the more significant bit $b_0$ is nonzero is one bit more to the left (or one bit less to the right) than the bit shift if the less significant bit $b_1$ is nonzero.

Exactly the same applies to the other variable shift blocks $24_1, \ldots, 24_{n-1}$.

The outputs of the variable shift blocks $24_0, 24_1, \ldots, 24_{n-1}$ are then passed to combination circuitry 28, where they are combined, and then to an output line 30. The function of the combination circuitry 28 is to add together the outputs of the variable shift blocks $24_0, 24_1, \ldots, 24_{n-1}$, while applying appropriate further bit shifts so that the correct final result is obtained.

The variable shift block $24_0$ is providing the result of multiplying the input data by the two most significant bits of the constant value, while the variable shift block $24_1$ is providing the result of multiplying the input data by the next two most significant bits of the constant value, and so on, and the variable shift block $24_{n-1}$ is providing the result of multiplying the input data by the two least significant bits of the constant value. Therefore, the output of the variable shift block $24_0$ must be shifted to the left by two bits more (or to the right by two bits less) in total than the output of the variable shift block $24_1$, and so on, until the output of the variable shift block $24_0$ is shifted to the left by 2(n−2) bits more (or to the right by 2(n−2) bits less) in total than the output of the variable shift block $24_{n-1}$.

This can be achieved by setting different possible shift values for the variable shift blocks $24_0, 24_1, \ldots, 24_{n-1}$, or by applying different shift values to the outputs of the variable shift blocks, or by a combination of these two elements.

The result is thus a multiplier which uses relatively little hardware, and can be controlled as desired to produce the required result.

Figure 2:
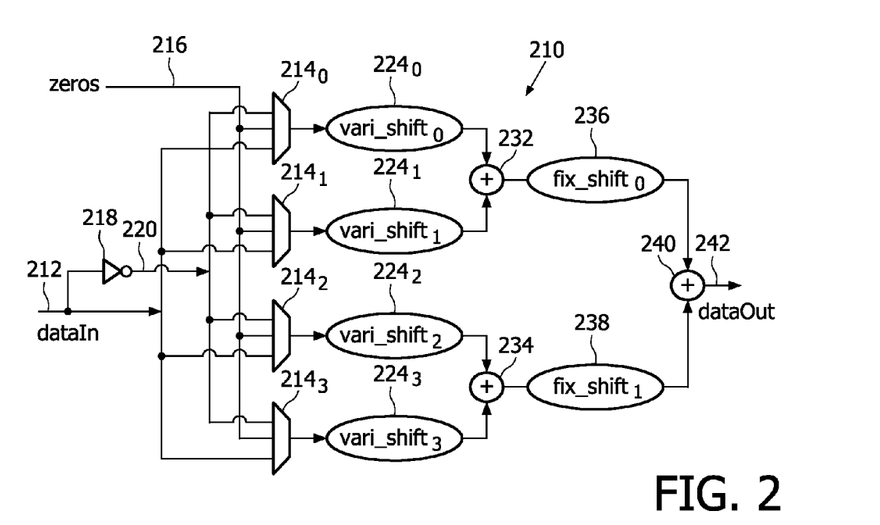
FIG. 2 is a block schematic diagram showing in more detail the general form of a multiplier in accordance with the present invention, for multiplying data by 8-bit constants.

FIG. 2 is a block schematic diagram showing the general form of a multiplier in accordance with the present invention, for multiplying data by 8-bit constants, and illustrating how the combination circuitry can operate.

In FIG. 2, the input data values to the multiplexer 210 are received on a data line 212. The constants are each of eight bits, and so the input data values received on the data line 212 are applied to respective first inputs of each of four multiplexers $214_0, 214_1, \ldots 214_3$.

A second input line 216 carries all zeros, and these are applied to respective second inputs of the multiplexers $214_0, 214_1, \ldots, 214_3$. The input data values received on the data line 212 are also applied to an inverter 218, to form the twos-complement of the input data values, and the resulting twos-complemented version of the input data values are applied on the inverse line 220 to respective third inputs of the multiplexers $214_0, 214_1, \ldots, 214_3$.

The multiplexers $214_0, 214_1, \ldots, 214_3$ are controlled by a control signal on a control line (not shown), as described with reference to FIG. 1. Thus, the first multiplexer $214_0$ is controlled by the first two bits $b_0b_1$ of the constant value which is in use at this moment, the second multiplexer $214_1$ is controlled by the third and fourth bits $b_2b_3$ of the constant value which is in use at this moment, the third multiplexer $214_2$ is controlled by the fifth and sixth bits $b_4b_5$ of the constant value which is in use at this moment, and the fourth multiplexer $214_3$ is controlled by the seventh and eighth bits $b_6b_7$ of the constant value which is in use at this moment.

If $b_0b_1$ equals 0 0, the first multiplexer $214_0$ is controlled such that it passes to its output the value on its second input, namely all zeros. If $b_0b_1$ equals 0 1 or 1 0, the first multiplexer $214_0$ is controlled such that it passes to its output the value on its first input, namely the input data value. If $b_0b_1$ equals 0 −1 or −1 0, the first multiplexer $214_0$ is controlled such that it passes to its output the value on its third input, namely the twos-complemented version of the input data value.

The other multiplexers are controlled by their respective pairs of bits from the constant value which is in use at this moment, in a corresponding way.

The outputs from the multiplexers $214_0, 214_1, \ldots, 214_3$ are passed to respective variable shift blocks $224_0, 224_1, \ldots, 224_3$, and the variable shift blocks $224_0, 224_1, \ldots, 224_3$ are controlled by a control signal on a control line (not shown) as described above with reference to FIG. 1.

Specifically, the first variable shift block $224_0$ is controlled on the basis of the first two bits $b_0b_1$ of the constant value which is in use at this moment, the second variable shift block $224_1$ is controlled on the basis of the third and fourth bits $b_2b_3$ of the constant value which is in use at this moment, and so on.

The variable shift blocks $224_0, 224_1, \ldots, 224_3$ can be right shifters, or left shifters, or a combination of right shifters and left shifters, as described above.

The outputs of the first and second variable shift blocks $224_0$ and $224_1$ are passed to a first adder 232, while the outputs of the third and fourth variable shift blocks $224_2$ and $224_3$ are passed to a second adder 234.

The output of the first adder 232 is passed to a first fixed shift block 236, which applies a first fixed shift value. The output of the second adder 234 is passed to a second fixed shift block 238, which applies a second fixed shift value. The outputs of the first fixed shift block 236 and the second fixed shift block 238 are passed to a third adder 240, and the output of the third adder 240 is supplied as a data output on the output line 242.

The shift values applied by the four variable shift blocks $224_0, 224_1, \ldots, 224_3$ and the two fixed shift blocks 236, 238 are then set such that the output of the first variable shift block $224_0$ is shifted to the left by two bits more (or to the right by two bits less) in total than the output of the second variable shift block $224_1$, the output of the second variable shift block $224_1$ is shifted to the left by two bits more (or to the right by two bits less) in total than the output of the third variable shift block $224_2$, and the output of the third variable shift block $224_2$ is shifted to the left by two bits more (or to the right by two bits less) in total than the output of the fourth variable shift block $224_3$.

Figure 3:
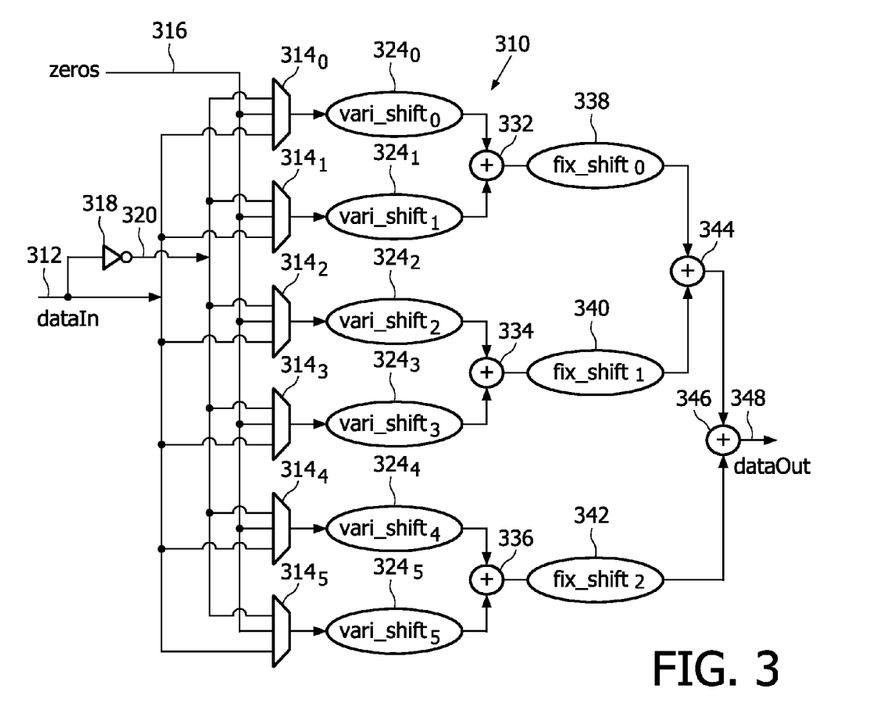
FIG. 3 is a block schematic diagram showing in more detail the general form of a multiplier in accordance with the present invention, for multiplying data by 12-bit constants.

FIG. 3 is a block schematic diagram showing the general form of a multiplier in accordance with the present invention, for multiplying data by 12-bit constants, and illustrating how the combination circuitry can operate in this case.

In FIG. 3, the input data values to the multiplier 310 are received on a data line 312. The constants are each of twelve bits, and so the input data values received on the data line 312 are applied to respective first inputs of each of six multiplexers $314_0, 314_1, \ldots, 314_5$.

A second input line 316 carries all zeros, and these are applied to respective second inputs of the multiplexers $314_0, 314_1, \ldots, 314_5$. The input data values received on the data line 312 are also applied to an inverter 318, to form the twos-complement of the input data values, and the resulting twos-complemented version of the input data values are applied on the inverse line 320 to respective third inputs of the multiplexers $314_0, 314_1, \ldots, 314_5$.

The multiplexers $314_0, 314_1, \ldots, 314_5$ are controlled by a control signal on a control line (not shown), as described with reference to FIG. 1. Thus, the first multiplexer $314_0$ is controlled by the first two bits $b_0b_1$ of the constant value which is in use at this moment, the second multiplexer $314_1$ is controlled by the third and fourth bits $b_2b_3$ of the constant value which is in use at this moment, the third multiplexer $314_2$ is controlled by the fifth and sixth bits $b_4b_5$ of the constant value which is in use at this moment, the fourth multiplexer $314_3$ is controlled by the seventh and eighth bits $b_6b_7$ of the constant value which is in use at this moment, the fifth multiplexer $314_4$ is controlled by the ninth and tenth bits $b_8b_9$ of the constant value which is in use at this moment, and the sixth multiplexer $314_5$ is controlled by the eleventh and twelfth bits $b_{10}b_{11}$ of the constant value which is in use at this moment.

If $b_0b_1$ equals 0 0, the first multiplexer $314_0$ is controlled such that it passes to its output the value on its second input, namely all zeros. If $b_0b_1$ equals 0 1 or 1 0, the first multiplexer $314_0$ is controlled such that it passes to its output the value on its first input, namely the input data value. If $b_0b_1$ equals 0 −1 or −1 0, the first multiplexer $314_0$ is controlled such that it passes to its output the value on its third input, namely the twos-complemented version of the input data value.

The other multiplexers are controlled by their respective pairs of bits from the constant value which is in use at this moment, in a corresponding way.

The outputs from the multiplexers $314_0, 314_1, \ldots, 314_5$ are passed to respective variable shift blocks $324_0, 324_1, \ldots, 324_5$, and the variable shift blocks $324_0, 324_1, \ldots, 324_5$ are controlled by a control signal on a control line (not shown) as described above with reference to FIG. 1.

Specifically, the first variable shift block $324_0$ is controlled on the basis of the first two bits $b_0b_1$ of the constant value which is in use at this moment, the second variable shift block $324_1$ is controlled on the basis of the third and fourth bits $b_2b_3$ of the constant value which is in use at this moment, and so on.

The variable shift blocks $324_0, 324_1, \ldots, 324_5$ can be right shifters, or left shifters, or a combination of right shifters and left shifters, as described above.

The outputs of the first and second variable shift blocks $324_0$ and $324_1$ are passed to a first adder 332, while the outputs of the third and fourth variable shift blocks $324_2$ and $324_3$ are passed to a second adder 334, and the outputs of the fifth and sixth variable shift blocks $324_4$ and $324_5$ are passed to a third adder 336.

The output of the first adder 332 is passed to a first fixed shift block 338, which applies a first fixed shift value. The output of the second adder 334 is passed to a second fixed shift block 340, which applies a second fixed shift value. The output of the third adder 336 is passed to a third fixed shift block 342, which applies a third fixed shift value.

The outputs of the first fixed shift block 336 and the second fixed shift block 340 are passed to a fourth adder 344. The outputs of the third fixed shift block 342 and of the fourth adder 344 are passed to a fifth adder 346, and the output of the fifth adder 346 is supplied as a data output on the output line 348.

The shift values applied by the six variable shift blocks $324_0, 324_1, \ldots, 324_5$ and the three fixed shift blocks 338, 340, 342 are then set such that the output of the first variable shift block $324_0$ is shifted to the left by two bits more (or to the right by two bits less) in total than the output of the second variable shift block $324_1$, the output of the second variable shift block $324_1$ is shifted to the left by two bits more (or to the right by two bits less) in total than the output of the third variable shift block $324_2$, the output of the third variable shift block $324_2$ is shifted to the left by two bits more (or to the right by two bits less) in total than the output of the fourth variable shift block $324_3$, the output of the fourth variable shift block $324_3$ is shifted to the left by two bits more (or to the right by two bits less) in total than the output of the fifth variable shift block $324_4$, and the output of the fifth variable shift block $324_4$ is shifted to the left by two bits more (or to the right by two bits less) in total than the output of the sixth variable shift block $324_5$.

Figure 4:
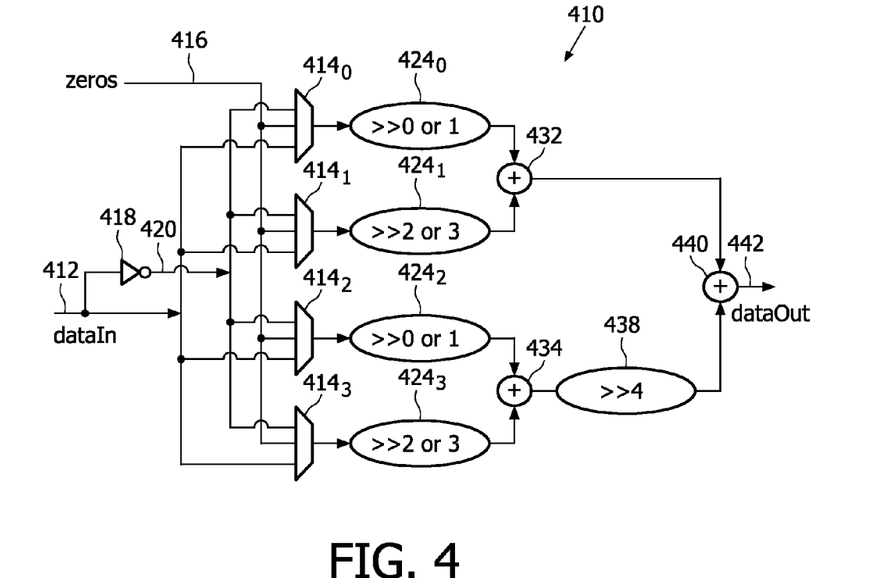
FIG. 4 is a block schematic diagram showing a first multiplier in accordance with the present invention, for multiplying data by 8-bit constants.

FIG. 4 is a block schematic diagram showing a specific form of a multiplier in accordance with the present invention, for multiplying data by 8-bit constants.

In FIG. 4, the input data values to the multiplexer 410 are received on a data line 412. The constants are each of eight bits, and so the input data values received on the data line 412 are applied to respective first inputs of each of four multiplexers $414_0$, $414_1$, ..., $414_3$.

A second input line 416 carries all zeros, and these are applied to respective second inputs of the multiplexers $414_0$, $414_1$, ..., $414_3$. The input data values received on the data line 412 are also applied to an inverter 418, to form the twos-complement of the input data values, and the resulting twos-complemented version of the input data values are applied on the inverse line 420 to respective third inputs of the multiplexers $414_0$, $414_1$, ..., $414_3$.

The multiplexers $414_0$, $414_1$, ..., $414_3$ are controlled by a control signal on a control line (not shown), as described with reference to FIG. 1. Thus, the first multiplexer $414_0$ is controlled by the first two bits $b_0b_1$ of the constant value which is in use at this moment, the second multiplexer $414_1$ is controlled by the third and fourth bits $b_2b_3$ of the constant value which is in use at this moment, the third multiplexer $414_2$ is controlled by the fifth and sixth bits $b_4b_5$ of the constant value which is in use at this moment, and the fourth multiplexer $414_3$ is controlled by the seventh and eighth bits $b_6b_7$ of the constant value which is in use at this moment.

If $b_0b_1$ equals 0 0, the first multiplexer $414_0$ is controlled such that it passes to its output the value on its second input, namely all zeros. If $b_0b_1$ equals 0 1 or 1 0, the first multiplexer $414_0$ is controlled such that it passes to its output the value on its first input, namely the input data value. If $b_0b_1$ equals 0 −1 or −1 0, the first multiplexer $414_0$ is controlled such that it passes to its output the value on its third input, namely the twos-complemented version of the input data value.

The other multiplexers are controlled by their respective pairs of bits from the constant value which is in use at this moment, in a corresponding way.

The outputs from the multiplexers $414_0$, $414_1$, ..., $414_3$ are passed to respective variable shift blocks $424_0$, $424_1$, ..., $424_3$, and the variable shift blocks $424_0$, $424_1$, ..., $424_3$ are controlled by a control signal on a control line (not shown) as described above with reference to FIG. 1.

Specifically, the first variable shift block $424_0$ is controlled on the basis of the first two bits $b_0b_1$ of the constant value which is in use at this moment, the second variable shift block $424_1$ is controlled on the basis of the third and fourth bits $b_2b_3$ of the constant value which is in use at this moment, and so on.

The first variable shift block $224_0$ can either apply no shift, or can shift the data to the right by one bit, the second variable shift block $224_1$ can either shift the data to the right by two bits or by three bits, the third variable shift block $224_2$ can either apply no shift, or can shift the data to the right by one bit, and the fourth variable shift block $224_3$ can either shift the data to the right by two bits or by three bits.

The outputs of the first and second variable shift blocks $424_0$ and $424_1$ are passed to a first adder 432, while the outputs of the third and fourth variable shift blocks $424_2$ and $424_3$ are passed to a second adder 434.

No fixed shift is applied to the output of the first adder 232. The output of the second adder 434 is passed to a fixed shift block 438, which applies a fixed shift of four bits to the right. The outputs of the first adder 432 and the fixed shift block 438 are passed to a third adder 440, and the output of the third adder 440 is supplied as a data output on the output line 442.

Thus, as required, the output of the first variable shift block $424_0$ is shifted to the right by 0 bits or 1 bit; the output of the second variable shift block $424_1$ is shifted to the right by 2 bits or 3 bits; the output of the third variable shift block $424_2$ is shifted to the right by 4 bits or 5 bits (by means of the variable shift block $424_2$ and the fixed shift block 438); and the output of the fourth variable shift block $424_3$ is shifted to the right by 6 bits or 7 bits.

This structure has a lower truncation error than some conventional devices. However, in accordance with the invention, the truncation error can be reduced further.

Figure 5:
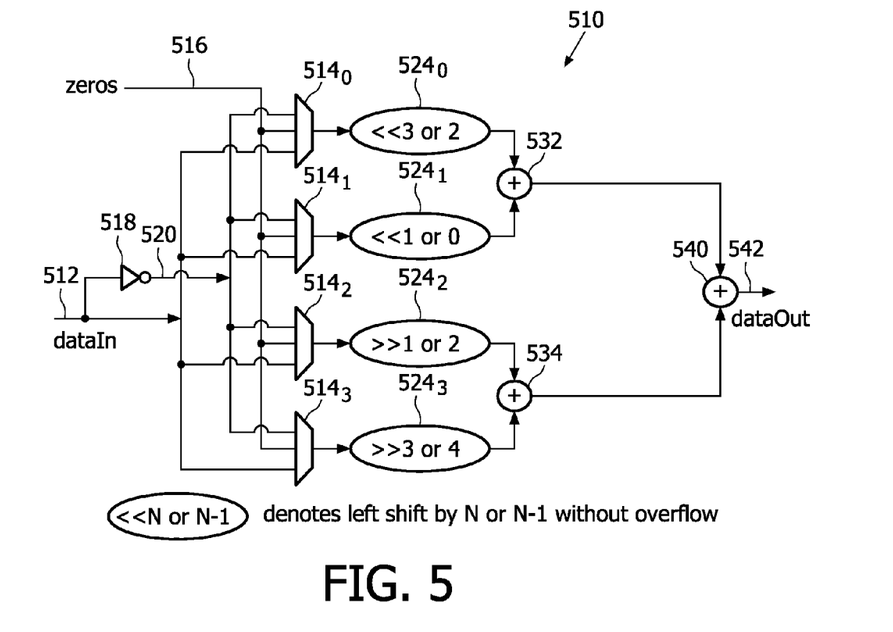
FIG. 5 is a block schematic diagram showing a second multiplier in accordance with the present invention, for multiplying data by 8-bit constants.

FIG. 5 is therefore a block schematic diagram showing a specific form of a multiplier in accordance with the present invention, for multiplying data by 8-bit constants.

In FIG. 5, the input data values to the multiplexer 510 are received on a data line 512. The input data values received on the data line 512 are applied to respective first inputs of each of four multiplexers $514_0$, $514_1$, ..., $514_3$.

A second input line 516 carries all zeros, and the input data values received on the data line 512 are also applied to an inverter 518, with the inverter output being applied on the inverse line 520 to respective third inputs of the multiplexers $514_0$, $514_1$, ..., $514_3$.

The operation of the multiplexers $514_0$, $514_1$, ..., $514_3$ is exactly the same as that of the multiplexers $414_0$, $414_1$, ..., $414_3$ in FIG. 4, and this will not be described again.

The outputs from the multiplexers $514_0$, $514_1$, ..., $514_3$ are passed to respective variable shift blocks $524_0$, $524_1$, ..., $524_3$, and the principle of operation of the variable shift blocks $524_0$, $524_1$, ..., $524_3$ is exactly the same as that of the variable shift blocks $424_0$, $424_1$, ..., $424_3$ in FIG. 4, and this will not be described again.

However, in this case, the first variable shift block $524_0$ can either shift the data to the left by three bits or by two bits, without truncation, the second variable shift block $524_1$ can either shift the data to the left by one bit, without truncation, or can apply no bit shift, the third variable shift block $524_2$ can either shift the data to the right by one bit or by two bits, and the fourth variable shift block $224_3$ can either shift the data to the right by three bits or by four bits.

The fact that the first variable shift block $524_0$ and the second variable shift block $524_1$ can shift the data to the left, without truncation, improves the precision of the device, albeit at the cost of slightly more complex hardware.

The outputs of the first and second variable shift blocks $524_0$ and $524_1$ are passed to a first adder 532, while the outputs of the third and fourth variable shift blocks $524_2$ and $524_3$ are passed to a second adder 534.

No fixed shift is applied to the output of either the first adder 532 or the second adder 534. The outputs of the first adder 532 and the second adder 534 are passed to a third adder 540, and the output of the third adder 540 is supplied as a data output on the output line 542.

Thus, as required, the output of the first variable shift block $524_0$ is shifted to the left by 3 bits or 2 bits; the output of the second variable shift block $524_1$ is shifted to the left by 1 bits or 0 bits; the output of the third variable shift block $524_2$ is shifted to the right by 1 bit or 2 bits; and the output of the fourth variable shift block $524_3$ is shifted to the right by 3 bits or 4 bits.

Figure 6:
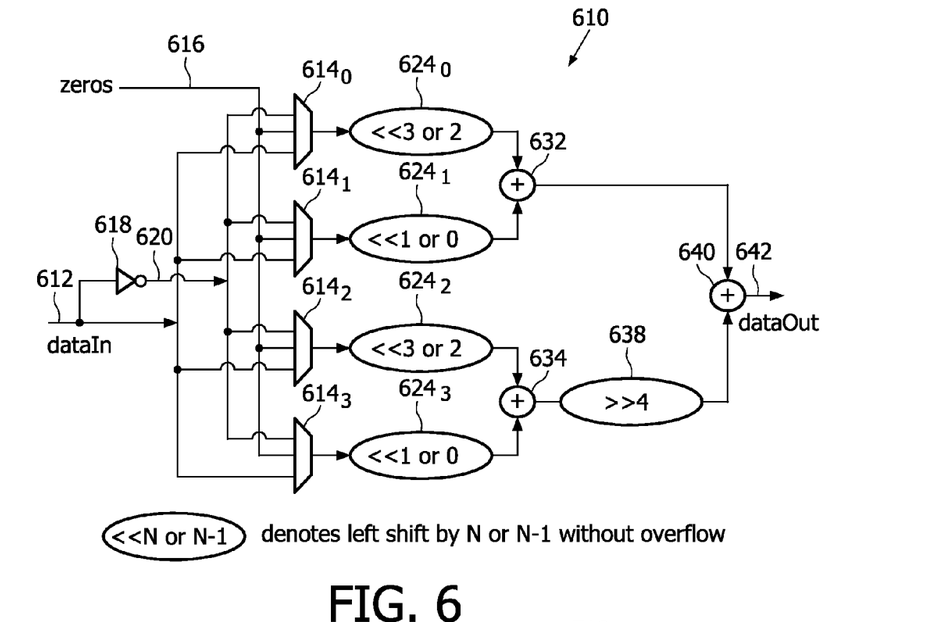
FIG. 6 is a block schematic diagram showing a third multiplier in accordance with the present invention, for multiplying data by 8-bit constants.

FIG. 6 is a block schematic diagram showing a further specific form of a multiplier in accordance with the present invention, for multiplying data by 8-bit constants, again achieving smaller truncation errors than the embodiment shown in FIG. 4.

In FIG. 6, the input data values to the multiplier 610 are received on a data line 612. The input data values received on the data line 612 are applied to respective first inputs of each of four multiplexers $614_0, 614_1, \ldots, 614_3$.

A second input line 616 carries all zeros, and the input data values received on the data line 612 are also applied to an inverter 618, with the inverter output being applied on the inverse line 620 to respective third inputs of the multiplexers $614_0, 614_1, \ldots, 614_3$.

The operation of the multiplexers $614_0, 614_1, \ldots, 614_3$ is exactly the same as that of the multiplexers $414_0, 414_1, \ldots, 414_3$ in FIG. 4, and this will not be described again.

The outputs from the multiplexers $614_0, 614_1, \ldots, 614_3$ are passed to respective variable shift blocks $624_0, 624_1, \ldots, 624_3$, and the principle of operation of the variable shift blocks $624_0, 624_1, \ldots, 624_3$ is exactly the same as that of the variable shift blocks $424_0, 424_1, \ldots, 424_3$ in FIG. 4, and this will not be described again.

However, in this case, the first variable shift block $624_0$ can either shift the data to the left by three bits or by two bits, without truncation, the second variable shift block $624_1$ can either shift the data to the left by one bit, without truncation, or can apply no bit shift, the third variable shift block $624_2$ can either shift the data to the left by three bits or by two bits, without truncation, and the fourth variable shift block $624_3$ can either shift the data to the left by one bit, without truncation, or can apply no bit shift.

Again, the fact that the first variable shift blocks $624_0$-$624_3$ can shift the data to the left, without truncation, improves the precision of the device, albeit at the cost of slightly more complex hardware.

The outputs of the first and second variable shift blocks $624_0$ and $624_1$ are passed to a first adder 632, while the outputs of the third and fourth variable shift blocks $624_2$ and $624_3$ are passed to a second adder 634.

No fixed shift is applied to the output of the first adder 632, while the output of the second adder 634 is applied to a fixed shift block 638, which applies a shift of 4 bits to the right. The outputs of the first adder 632 and the fixed shift block 638 are passed to a third adder 640, and the output of the third adder 640 is supplied as a data output on the output line 642.

Thus, as required, the output of the first variable shift block $624_0$ is shifted to the left by 3 bits or 2 bits; the output of the second variable shift block $624_1$ is shifted to the left by 1 bits or 0 bits; the output of the third variable shift block $624_2$ is shifted to the right by 1 bit or 2 bits (considering the effect of the third variable shift block $624_2$ and the fixed shift block 638 together); and the output of the fourth variable shift block $624_3$ is shifted to the right by 3 bits or 4 bits (considering the effect of the fourth variable shift block $624_3$ and the fixed shift block 638 together).

Figure 7:
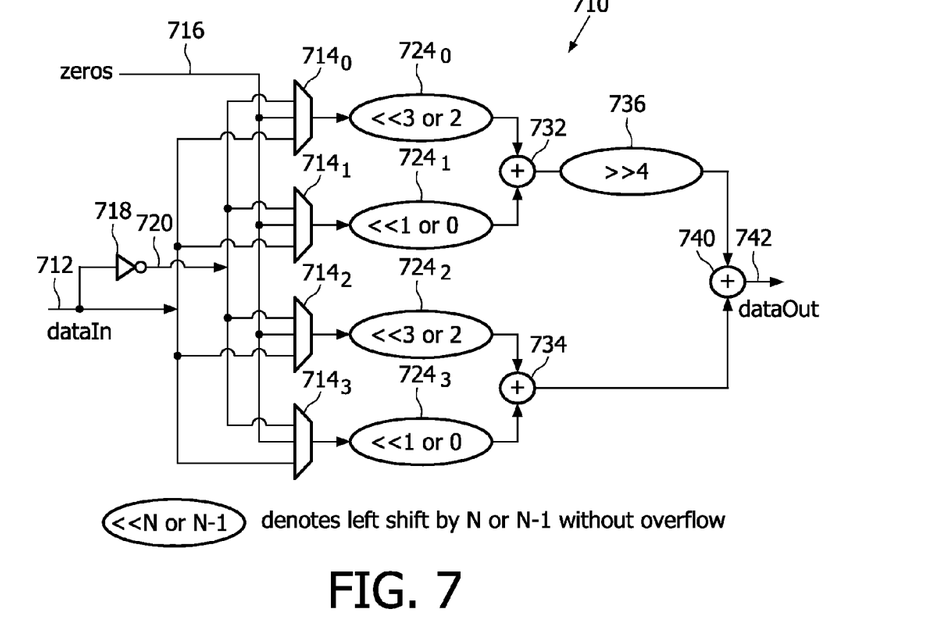
FIG. 7 is a block schematic diagram showing a fourth multiplier in accordance with the present invention, for multiplying data by 8-bit constants.

It is also possible to use a structure which suffers from no truncation errors, again at a cost of slightly further increased hardware complexity, because the bit precision of the outputs must be increased. FIG. 7 is a block schematic diagram showing a further specific form of a multiplier in accordance with the present invention, for multiplying data by 8-bit constants, without truncation errors.

In FIG. 7, the input data values to the multiplier 710 are received on a data line 712. The input data values received on the data line 712 are applied to respective first inputs of each of four multiplexers $714_0, 714_1, \ldots, 714_3$.

A second input line 716 carries all zeros, and the input data values received on the data line 712 are also applied to an inverter 718, with the inverter output being applied on the inverse line 720 to respective third inputs of the multiplexers $714_0, 714_1, \ldots, 714_3$.

The operation of the multiplexers $714_0, 714_1, \ldots, 714_3$ is exactly the same as that of the multiplexers $414_0, 414_1, \ldots, 414_3$ in FIG. 4, and this will not be described again.

The outputs from the multiplexers $714_0, 714_1, \ldots, 714_3$ are passed to respective variable shift blocks $724_0, 724_1, \ldots, 724_3$, and the principle of operation of the variable shift blocks $724_0, 724_1, \ldots, 724_3$ is exactly the same as that of the variable shift blocks $424_0, 424_1, \ldots, 424_3$ in FIG. 4, and this will not be described again.

However, in this case, the first variable shift block $724_0$ can either shift the data to the left by three bits or by two bits, without truncation, the second variable shift block $724_1$ can either shift the data to the left by one bit, without truncation, or can apply no bit shift, the third variable shift block $724_2$ can either shift the data to the left by three bits or by two bits, without truncation, and the fourth variable shift block $724_3$ can either shift the data to the left by one bit, without truncation, or can apply no bit shift.

The outputs of the first and second variable shift blocks $724_0$ and $724_1$ are passed to a first adder 732, while the outputs of the third and fourth variable shift blocks $724_2$ and $724_3$ are passed to a second adder 734.

No fixed shift is applied to the output of the second adder 734, while the output of the first adder 732 is applied to a fixed shift block 736, which applies a shift of 4 bits to the left.

Again, the fact that the variable shift blocks $724_0$-$724_3$ and the fixed shift block 736 can shift the data to the left, without truncation, improves the precision of the device, albeit at the cost of slightly more complex hardware.

The outputs of the second adder 734 and the fixed shift block 736 are passed to a third adder 740, and the output of the third adder 740 is supplied as a data output on the output line 742.

Thus, as required, the output of the first variable shift block $724_0$ is shifted to the left by 7 bits or 6 bits (considering the effect of the first variable shift block $724_0$ and the fixed shift block 736 together); the output of the second variable shift block $624_1$ is shifted to the left by 5 bits or 4 bits (considering the effect of the second variable shift block $724_1$ and the fixed shift block 736 together); the output of the third variable shift block $724_2$ is shifted to the left by 3 bits or 2 bits; and the output of the fourth variable shift block $724_3$ is shifted to the left by 1 bit or has no bit shift applied.

There are thus described specific embodiments for multiplying data by any set of 8-bit constants, and it will be appreciated that the same principle can be applied to constants of any length.

When the multiplier is to be used with a set of constants that is known in advance, some simplifications can be made, since the multiplier may not need to be able to operate with some of the possible values.

Specifically, each pair of two consecutive bits (i.e. $b_{2n}$ $b_{2n+1}$) should be checked, for the entire set of constants to be supported by the CSD multiplier. For each value of n (i.e. n=0, 1, 2, 3 in the case of 8-bit constants), all of the values of $b_{2n}b_{2n+1}$ can be listed. Then, again for each value of n, the listed values are examined, to determine whether any simplification of the corresponding multiplexer, shifter and adder can be made.

With regard to the multiplexer, it was mentioned above that there are five possible pairs of values for two consecutive bits. These can be divided into three subsets: subset0={0 0}; subset1={1 0, 0 1}; subset2={−1 0, 0 −1}. If the listed values of $b_{2n}b_{2n+1}$ come from just one of the above subsets, the respective multiplexer can be removed, as the required multiplexer output is always zeros, or the data input, or the twos-complement of the data input, depending on the subset. If the listed values come from two of the above subsets, the corresponding multiplexer is reduced from 3:1 to 2:1, since one of the possible multiplexer inputs is never selected.

With regard to the variable bit shifter, the five possible pairs of values for two consecutive bits can again be divided into three subsets, though these are different from the subsets mentioned above, namely subset0={0 0}; subset1*={1 0, −1 0}; subset2*={0 1, 0 −1}. If only values in one of subset1* and subset2* are contained in the listed values, the shifter controlled by the bit pair $b_{2n}b_{2n+1}$ is optimized to a fixed shifter, since only one shift value is ever applied. If the listed values only come from subset0, the shifter can be removed.

With regard to the adder, then, if a shifter is removed as described above, the corresponding adder, that would have received one of its inputs from that shifter, can also be removed.

There is thus described a multiplier that can provide outputs at a required degree of precision, without excessive hardware requirements.

The invention claimed is:

1. A multiplier, for multiplying an input data value by a selected constant value in CSD form, the selected constant value comprising a plurality of pairs of bits, the multiplier comprising: a plurality of multiplexers, wherein each of said multiplexers is controlled by a respective pair of bits of the selected constant value, and wherein each of said multiplexers has a plurality of inputs, and is connected to receive the input data value, the inverse of the input data value, and all zeros on said inputs, and being controlled such that it outputs either the input data value, the inverse of the input data value, or all zeros, depending on the values of the respective pair of bits of the selected constant value; a plurality of variable shift blocks, each connected to receive an input from a respective one of said multiplexers, and each being adapted to shift its received input by a first bit shift value or a second bit shift value, depending on the values of the respective pair of bits of the selected constant value, wherein the first bit shift value and the second bit shift value differ by 1; and combination circuitry, for receiving the outputs from the plurality of variable shift blocks, and for combining the outputs from the plurality of variable shift blocks and applying further bit shifts, to form an output value equal to the result of multiplying the input data value by the selected constant value.

2. A multiplier as claimed in claim 1, wherein said combination circuitry comprises an adder, connected to receive the outputs from two of said plurality of variable shift blocks, and a fixed shift block, adapted to receive an output from the adder as its input, and to shift its received input by a fixed bit shift value.

3. A multiplier as claimed in claim 2, wherein the fixed shift block comprises a left shifter, for shifting its input by one or more bit positions to the left, without truncation.

4. A multiplier as claimed in claim 2, further comprising at least one further fixed shift block, connected to receive an input from a respective one of said multiplexers, and being adapted to shift its received input by a respective fixed bit shift value.

5. A multiplier as claimed in claim 1, wherein there is one said multiplexer for each said pair of bits of the selected constant value.

6. A multiplier as claimed in claim 1, further comprising at least one multiplexer, controlled by a respective pair of bits of the selected constant value, wherein said multiplexer has at least one input, and is connected to receive one or more of the input data value, the inverse of the input data value, and all zeros on said at least one input, and being controlled such that it outputs one of said received values, depending on the values of the respective pair of bits of the selected constant value.

7. A multiplier as claimed in claim 1, wherein at least one of said variable shift blocks comprises a left shifter, for shifting its input by one or more bit positions to the left, without truncation.

8. A method of multiplying an input data value by a selected constant value in CSD form, the method comprising: dividing the selected constant value into a plurality of pairs of bits; controlling each of a plurality of multiplexers on the basis of bit values of a respective one of said pairs of bits of the selected constant value; outputting from each of said plurality of multiplexers either the input data value, the inverse of the input data value, or all zeros, depending on the bit values of the respective one of said pairs of bits of the selected constant value; applying the outputs from said plurality of multiplexers to respective variable shift blocks; controlling each of the variable shift blocks on the basis of the bit values of the respective one of said pairs of bits of the selected constant value, such that said variable shift block shifts its received input by a respective first bit shift value or a respective second bit shift value, wherein the first bit shift value and the second bit shift value differ by 1; and combining the outputs from the plurality of shift blocks and applying further bit shifts, to form an output value equal to the result of multiplying the input data value by the selected constant value.

9. A method as claimed in claim 8, wherein said combining step includes a step of adding the outputs from two of said plurality of variable shift blocks, and applying a fixed bit shift to a result of said addition.

* * * * *